United States Patent
Brown

(10) Patent No.: US 9,898,546 B2
(45) Date of Patent: Feb. 20, 2018

(54) PRE-CACHING WEB CONTENT FOR A MOBILE DEVICE

(71) Applicant: BlackBerry Limited, Waterloo (CA)

(72) Inventor: Andrew James Guy Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/851,866

(22) Filed: Sep. 11, 2015

(65) Prior Publication Data

US 2015/0379157 A1    Dec. 31, 2015

Related U.S. Application Data

(63) Continuation of application No. 13/053,480, filed on Mar. 22, 2011, now Pat. No. 9,275,162.

(51) Int. Cl.
*G06F 17/30* (2006.01)
*H04L 29/08* (2006.01)

(52) U.S. Cl.
CPC ........ *G06F 17/30902* (2013.01); *H04L 67/02* (2013.01); *H04L 67/04* (2013.01); *H04L 67/2842* (2013.01); *H04L 67/2847* (2013.01); *H04L 67/2876* (2013.01)

(58) Field of Classification Search
CPC ................ H04L 67/2847; G06F 17/30902
USPC ............................................. 709/213
See application file for complete search history.

(56) References Cited

U.S. PATENT DOCUMENTS

| | | | |
|---|---|---|---|
| 6,748,450 B1 | 6/2004 | Dutta | |
| 7,058,691 B1 | 6/2006 | Yu et al. | |
| 7,254,614 B2 | 8/2007 | Mulligan et al. | |
| 7,284,035 B2 | 10/2007 | Yu et al. | |
| 7,457,304 B2 | 11/2008 | Roh et al. | |
| 7,483,910 B2 | 1/2009 | Beyer et al. | |
| 7,509,658 B2 | 3/2009 | Goring et al. | |
| 7,673,007 B2 | 3/2010 | Mulligan et al. | |

(Continued)

FOREIGN PATENT DOCUMENTS

| | | |
|---|---|---|
| CA | 2393900 | 1/2003 |
| CA | 2582064 | 11/2007 |

(Continued)

OTHER PUBLICATIONS

Optimizing Web Delivery Over Wireless Links: Design, Implementation, and Experiences, IEEE Journal on Selected Areas in Communications, vol. 23, No. 2, Feb. 2005, pp. 402-416.*

(Continued)

*Primary Examiner* — Suraj Joshi
(74) *Attorney, Agent, or Firm* — Moffat & Co.

(57) ABSTRACT

A web service for pre-caching web content on a mobile device includes receiving a request from the mobile device for first web content, fetching the first web content, determining second web content to pre-fetch based upon the first web content, fetching the second web content, and causing the second web content to be stored in a content cache on the mobile device responsive to the request for the first web content. Pre-caching web content in this manner provides web content to the mobile device that the user of the mobile device is likely to access. Pre-caching of additional web content prior to receiving an explicit request improves web browsing performance of the mobile device.

17 Claims, 5 Drawing Sheets

(56) References Cited

U.S. PATENT DOCUMENTS

| | | | |
|---|---|---|---|
| 7,730,199 | B2 | 6/2010 | Song et al. |
| 2002/0131404 | A1 | 9/2002 | Mehta et al. |
| 2003/0084165 | A1 | 5/2003 | Kjellberg et al. |
| 2004/0205121 | A1 | 10/2004 | Stephens |
| 2004/0261086 | A1 | 12/2004 | Jensen et al. |
| 2005/0091357 | A1 | 4/2005 | Krantz et al. |
| 2005/0138143 | A1* | 6/2005 | Thompson ........ G06F 17/30902 709/218 |
| 2007/0033569 | A1 | 2/2007 | Davidson et al. |
| 2007/0260674 | A1 | 11/2007 | Shenfield |
| 2009/0177732 | A1 | 7/2009 | Martin et al. |
| 2009/0234863 | A1 | 9/2009 | Evans |
| 2009/0291696 | A1 | 11/2009 | Cortes et al. |
| 2009/0318192 | A1 | 12/2009 | LeBlanc et al. |
| 2010/0281112 | A1 | 11/2010 | Plamondon |
| 2011/0021219 | A1 | 1/2011 | LeBlanc et al. |
| 2011/0040718 | A1* | 2/2011 | Tendjoukian ....... H04L 67/2847 706/52 |
| 2012/0136927 | A1 | 5/2012 | Dillon et al. |
| 2012/0164974 | A1 | 6/2012 | Eriksson et al. |

FOREIGN PATENT DOCUMENTS

| | | |
|---|---|---|
| CA | 2710036 | 7/2009 |
| CA | 2713395 | 8/2009 |
| EP | 1310868 | 5/2003 |
| EP | 2506533 | 10/2012 |
| WO | 0244892 | 6/2002 |
| WO | 02075527 | 9/2002 |
| WO | 2008134880 | 11/2008 |
| WO | 2009079794 | 7/2009 |
| WO | 2009100539 | 8/2009 |
| WO | 2012044451 | 4/2012 |

OTHER PUBLICATIONS

Canadian Intellectual Property Office, Office Action on Application No. 2,737,571, dated Aug. 6, 2015.
Non final office action from USPTO for related U.S. Appl. No. 13/152,565, dated Jun. 6, 2013.
Final office action from USPTO for related U.S. Appl. No. 13/152,565, dated Nov. 5, 2013.
Non final office action from USPTO for related U.S. Appl. No. 13/152,565, dated Mar 4, 2015.
Non final office action from USPTO for related U.S. Appl. No. 13/152,565, dated Aug. 6, 2015.
http://ajaxpatterns.org/Predictive_Fetch, as downloaded by Archive.org on Dec. 24, 2010.
Open Mobile Alliance "Generic Content Download Over the Air Specification", Version 1.0, Announcement Open Mobile Alliance, Jun. 20, 2002.
Nokia Corporation, "Series 60 Platform 1.0 Interoperability Overview" Aug. 1, 2002.
Precaching Definition from PC Magazine Encylopedia, as printed Mar. 6, 2011.
http://docs.blackberry.com/en/admin/deliverables/22986/Mobile_content_delivery_status_types_894726_11.jsp, as downloaded on Jul. 13, 2011.
Gosling J. et al., "The Java Language Environment a White Paper", Sun Delivers Java Workshop, Oct. 1, 1995.
Peter Lubbers: "Using HTML5 Application Cache to Create Offline Web Applications . . . ", Dec. 22, 2010.
Ladd, Seth, "Proposal to Enhance HTML5 APP Cache for Better Performance" Oct. 5, 2010.
R. Chakravorty, et al, "Optimizing Web Delivery Over Wireless Links: Design, Implementation, and Experiences", IEEE Journal on Selected Areas in Communications, vol. 23, No. 2, Feb. 2005, pp. 402-416.
Said, El Garouani, "Data Prefetching Algorithm in Mobile Environments", European Journal of Scientific Research, vol. 28, No. 3, 2009, pp. 478-491.
Song, Hui et al., "Cache-Miss-Initiated Prefetch in Mobile Environments", Computer Communications 28, 2005, pp. 741-753.
"Server Push Data Access Architecture", http://www.cs.iit.edu/~scs/research/push-io/push-io.htm, as printed Mar. 18, 2011.
"Prefetching Brand-new Documents for Improving the Web Performance", http://www.isoc.org/inet99/proceedings/posters/106/index.htm, as printed Mar. 18, 2011.
"Data Prefetching in the Era of Multicore processors", https://multicoreinfo.com/prefetching-multicore-processors/, as printed Mar. 18, 2011.
Extended European Search Report dated Jun. 9, 2011, from EP application No. 11162786.
Cheng-Zhong Xu et al., "Towards semantics-based Prefetching to Reduce Web Access Latency", Applications and the Internet, 2003, Proceedings, 2003 Symposium on Jan. 27-31, 2003, Piscataway, NJ, USA, IEEE, pp. 318-325, XP010629018.
Marquez, Johann et al., An Intelligent Technique for Controlling Web Prefetching Costs at the Server Side, Web Intelligence and Intelligent Agent Technology, 2008, IEEE/WIC/ACM International Conference on, IEE, Piscataway, NJ, USA, Dec. 9, 2008, pp. 669-675, XP031402953.
Wang, Zheng et al. "Prefetching in World Wide Web", Global Telecommunications Conference, 1996, Gloecom '96, London, UK, Nov. 18-22, 1996, pp. 28-32, XP010220168.
Xian-He Sun, "Improving Data Access Performance with Server Push Architecture", Parallel and Distributed Processing Symposium, 2007, IPDPS 2007, Mar. 26-30, 2007, pp. 1-6.
Canadian Intellectual Property Office, Office Action on Application No. 2,737,571, dated Jul. 17, 2013.
Canadian Intellectual Property Office, Office Action on Application No. 2,737,571, dated Jul. 9, 2014.
European Exam Report dated Jul. 6, 2012, from EP application No. 11162786.
European Exam Report dated Oct. 1, 2015, from EP application No. 11162786.

* cited by examiner

PRE-CACHING WEB CONTENT FOR A MOBILE DEVICE

RELATED APPLICATIONS

The present application is a continuation of U.S. patent application Ser. No. 13/053,480, Filed Mar. 22, 2011, and issued as U.S. Pat. No. 9,135,365 on Sep. 15, 2015, the entire contents of which are incorporated herein by reference.

TECHNICAL FIELD

The present technology relates generally to mobile devices and, more particularly, to web-browsing technologies associated with mobile devices.

BACKGROUND

Wireless communications devices and other such mobile devices have a radiofrequency transceiver for transmitting and receiving data over a wireless communication system. Many of these devices have a web-browsing capability. Both the uplink and downlink may limit the rate of data transfer, thus hindering performance at the device.

A variety of pre-fetching techniques have been proposed such as, for example, those disclosed in U.S. Pat. No. 7,058,691 (Yu et al.) entitled "System for Wireless Push and Pull Based Services" which pre-fetches content based on the average access latency for the content.

U.S. Patent Application Publication 2009/0291696 (Cortes et al.) entitled "Method and Apparatus for Pre-Fetching Data in a Mobile Network Environment Using Edge Data Storage" uses an intermediate node close to the wireless network to store data for the wireless device.

Pre-fetching for location-dependent mobile services is described in references such as "Data Prefetching Algorithm in Mobile Environments" by Said et al. in the European Journal of Scientific Research, (2009) Vol. 28, No. 3, pp. 478-491.

Although the foregoing represent some rudimentary attempts to pre-fetch data for a mobile device, improvements on these prior technologies remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
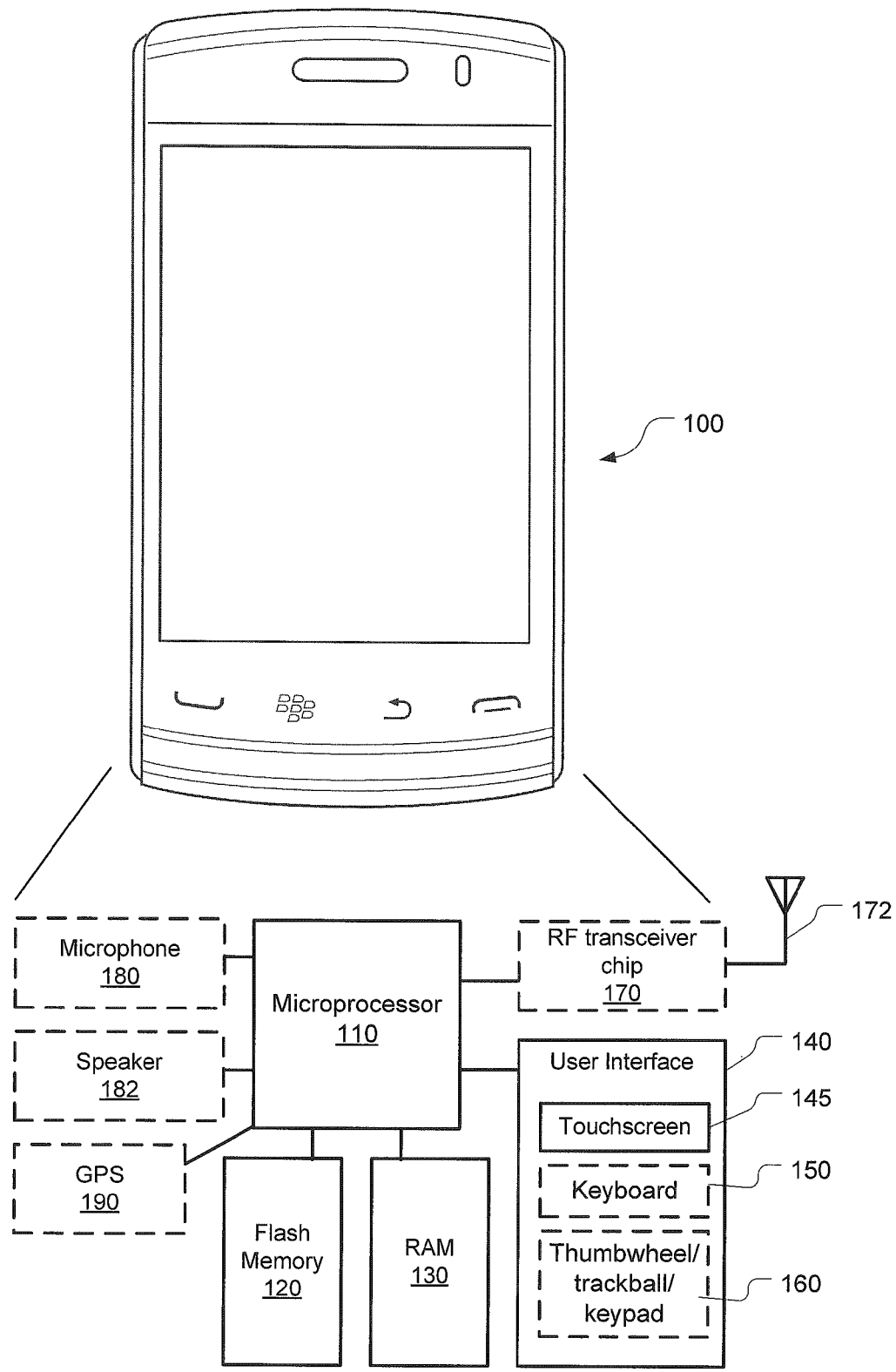
FIG. 1 is a schematic depiction of a wireless communications device as one example of a mobile device on which the present technology may be implemented.

In general, the present technology provides novel methods, computer-readable media, mobile device and system for pre-caching web content on a mobile device.

One aspect of the present technology is a method of providing web service to a mobile device. The method may be performed by a network proxy and may include receiving a request from the mobile device for first web content, fetching the first web content, determining second web content to pre-fetch based upon the first web content, fetching the second web content, and causing the second web content to be stored in a content cache on the mobile device responsive to the request for the first web content.

In one embodiment, the method includes retrieving first web content responsive to an HTTP or other web request from the mobile device, determining second web content to retrieve by parsing the first web content, fetching the second web content, and causing the second web content to be cached on the mobile device so that the mobile device is not required to send a second request for the second web content to the network proxy.

In this disclosure, retrieving web content may be referred to as fetching (e.g. requesting and receiving) web content. Web content that is fetched or retrieved is generally received from a web server or other server (e.g. a proxy or firewall). The term pre-fetching refers to the retrieval of additional web content associated with first web content, wherein it is likely that the additional web content will need to be retrieved for proper rendering of the first web content and where a request for the additional web content has not yet been received. Pre-fetching may be performed, for example, by a web browser client or a proxy client.

Pre-caching refers to the preloading of the additional web content onto a mobile device cache so that the additional web content is available for subsequent rendering or for use with the first web content without the mobile device sending a further request for the additional web content. Therefore, it may be said that pre-fetching is the automated retrieval (e.g. "pull" method) of additional web content, while pre-caching refers to the automated delivery (e.g. through a "push" method) of additional web content to a memory cache.

Another aspect of the present technology is a method performed in a device web proxy on a mobile device. The method may include receiving a web request message for requested web content and checking a content cache on the mobile device for the requested web content. If the requested web content is in the content cache, the method includes retrieving the requested web content from the content cache and responding to the web request message without transmitting the web request message via a wireless communications network. If the requested web content is not in the content cache, the method includes forwarding the web request message to the network proxy via the wireless communications network. The network proxy is configured to provide the requested web content to the device web proxy and to provide additional web content to the content cache.

Another aspect of the present technology is a computer-readable medium comprising instructions in code which when loaded into a memory and executed on a processor of a mobile device is adapted to cause the mobile device to perform one or more of the foregoing methods.

Yet another aspect of the present technology is a mobile device for browsing web content, the mobile device having a processor operatively coupled to memory for executing a browser for browsing the web, a radiofrequency transceiver for transmitting a web request and for receiving first web content in response to the web request, and a content parsing module executed by the processor to determine second web content based on the first web content and to check whether the second web content is cached in a content cache provided by the memory of the mobile device before transmitting a second web request for the second web content.

A further aspect of the present technology is a system for providing web service to a mobile device. The system includes a web proxy configured to fetch first web content for the mobile device and to determine second web content to pre-fetch for the mobile device based upon the first web content, and further configured to fetch the second web content and send the second web content to the mobile device (e.g. via a push server) without a further request from the mobile device for the second web content. A push server may be present in the system and may be configured to send the second web content to a content cache on the mobile device.

The details and particulars of these aspects of the technology will now be described below, by way of example, with reference to the attached drawings.

FIG. 1 is a schematic depiction of a wireless communications device as one example of a mobile device on which the present technology may be implemented. As shown by way of example in FIG. 1, the novel mobile device, which is designated generally by reference numeral 100, includes a processor (or microprocessor) 110 for executing one or more applications, memory in the form of flash memory 120 and/or RAM 130 (or any equivalent memory or storage devices) for storing the one or more applications and related data, and a user interface 140 with which the user interacts with the device. The user interface 140 of the mobile device 100 may include a touch-sensitive display screen 145. Alternatively, the user interface 140 may include a non-touch-sensitive liquid crystal display (LCD) and an alphanumeric keypad/keyboard 150. The device may include a trackball, thumbwheel or trackpad 160 for cursor movement and navigation. This mobile device is powered by an onboard battery (e.g. a lithium ion battery or equivalent rechargeable battery).

As shown by way of example in FIG. 1, the mobile device 100 includes a radiofrequency (RF) transceiver chip 170 and associated antenna 172 for wireless communications using any one of known wireless communication protocols such as, for example, GSM, UMTS, LTE, CDMA, W-CDMA, etc. For example, if the device is a GSM device, a SIM card is provided. Optionally, where the device is a voice-enabled wireless communications device such as, for example, a smartphone or cell phone, the device further includes a microphone 180 and a speaker 182 and/or an outlet jack for plugging in a set of earphones. This mobile device may optionally further include a Global Positioning System (GPS) receiver chipset 190 or other such location-determining subsystem. The mobile device may also have other components or subsystems that are not shown in this simplified figure such as, for example, a Wi-Fi short-range wireless transceiver, a Bluetooth® transceiver, a digital camera, etc. Although the mobile device presented by way of example in FIG. 1 is a wireless communications device, this novel technology may be utilized on any mobile or portable device, wireless-enabled computing tablet or device that has a wireless transceiver for downloading web content.

In accordance with an aspect of this disclosure, the mobile device is configured to pre-cache web content. Pre-caching may be used, for example, to improve web browsing performance. In general, and as will be elaborated below, the memory of the mobile device provides a content cache in which web content may be cached. Determining what web content to cache may be accomplished by parsing the content that has already been downloaded. In one implementation, content parsing (either on the mobile device or on a proxy server) enables pre-caching of all first-order links of a web site. In another implementation, content parsing may be performed by an artificial intelligence module that takes into account one or more of user behaviour patterns, user profiles, current time, current date and current location to predict intelligently which content the user is likely to seek to download next.

Figure 2:
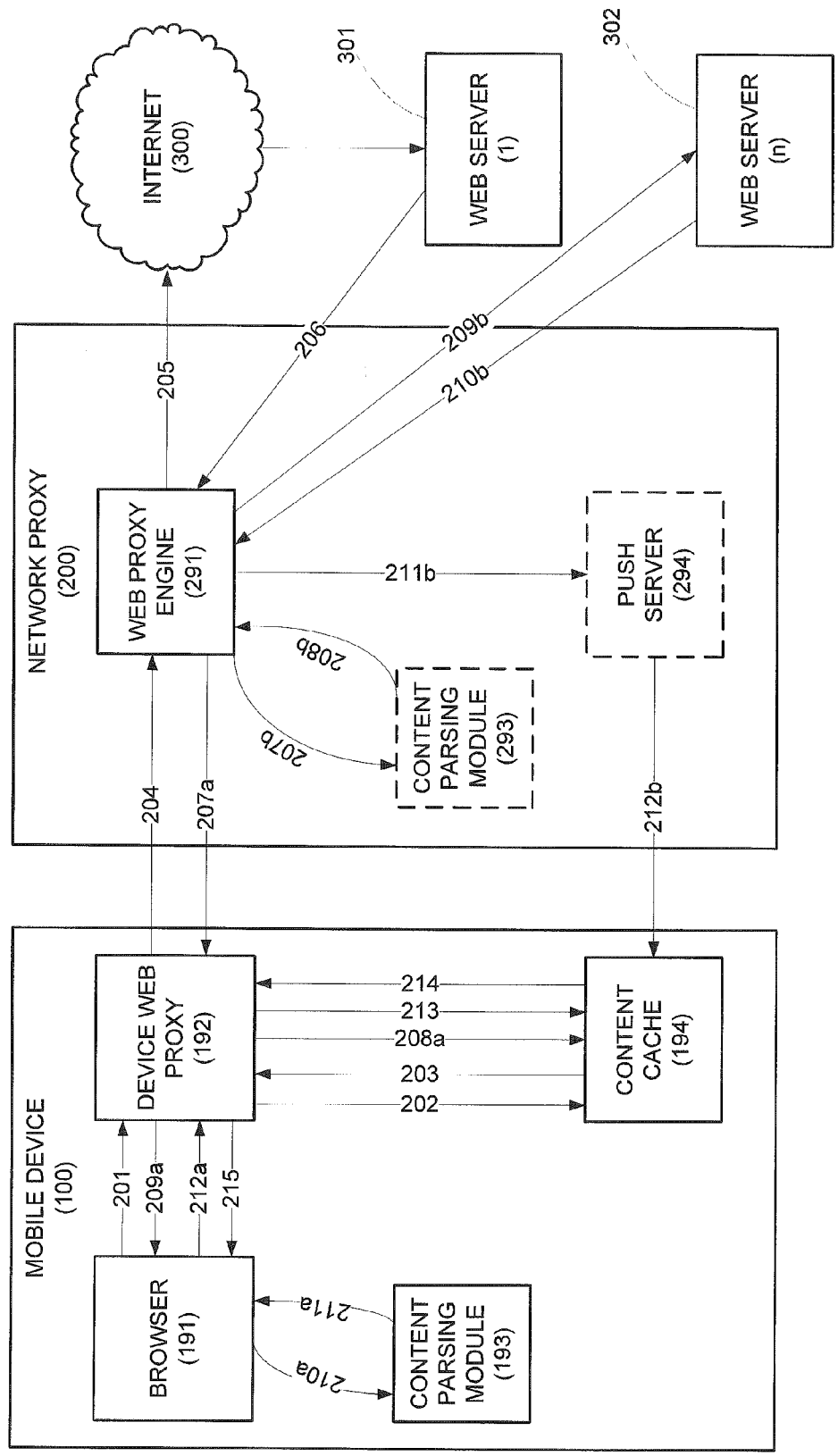
FIG. 2 is a schematic network layout showing sequential messaging among the mobile device, network proxy and web servers for implementing a novel method of pre-caching web content for the mobile device.

FIG. 2 is a schematic network layout showing sequential messaging among the mobile device 100, network proxy 200, which may be for example located in or part of a network operations center (NOC), and web servers 301, 302. Various components of FIG. 2 may be used for implementing a novel method of pre-caching web content for the mobile device 100. In this system, the mobile device 100 obtains web content from web servers 301, 302 (e.g. web server 1 and web server n) on the Internet 300 through the network proxy, e.g. through a network operations center (NOC) or equivalent mechanism.

As depicted in FIG. 2, the mobile device 100 includes a browser 191 (or Web-browsing application) which is stored in the memory 120, 130 and executed by the processor 110. The mobile device 100 includes a device web proxy 192 for mediating with a web proxy engine (or "proxy engine") 291 at the network proxy 200. The mobile device 100 also includes a content parser (or content parsing module) 193 for parsing the content of web pages already downloaded to the mobile device 100. The content cache 194, as mentioned above, is created in the memory 120, 130 of the mobile device 100 and serves as a repository for web content that has been downloaded directly by the mobile device 100 or, as will be explained below, for web content that is pushed to the mobile device 100 for pre-caching based on the determinations made by parsing the web content.

Figure 3:
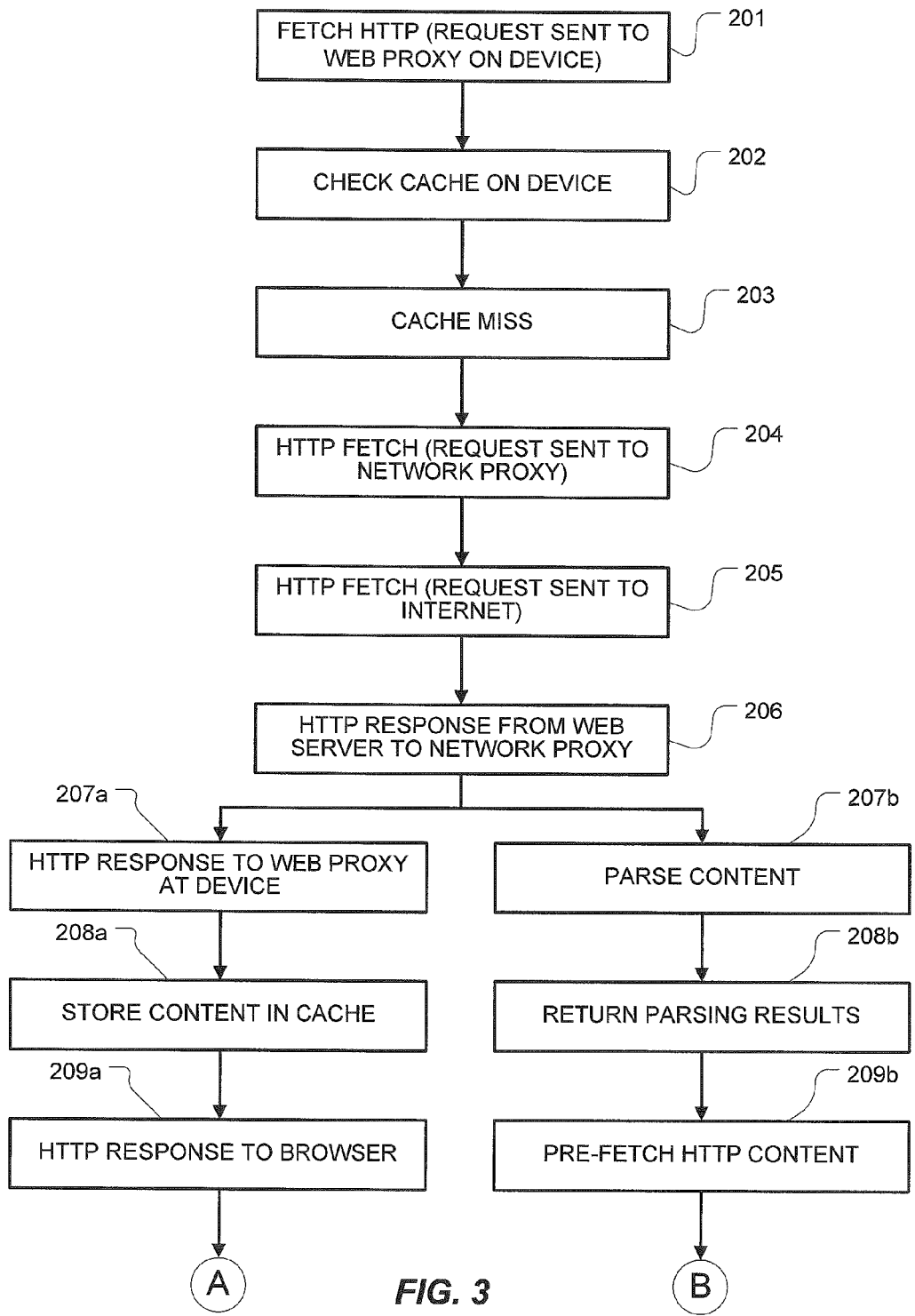
FIG. 3 is a first portion of a flowchart depicting main steps of a method of pre-caching web content for a mobile device in accordance with one implementation of the present technology.
Figure 4:
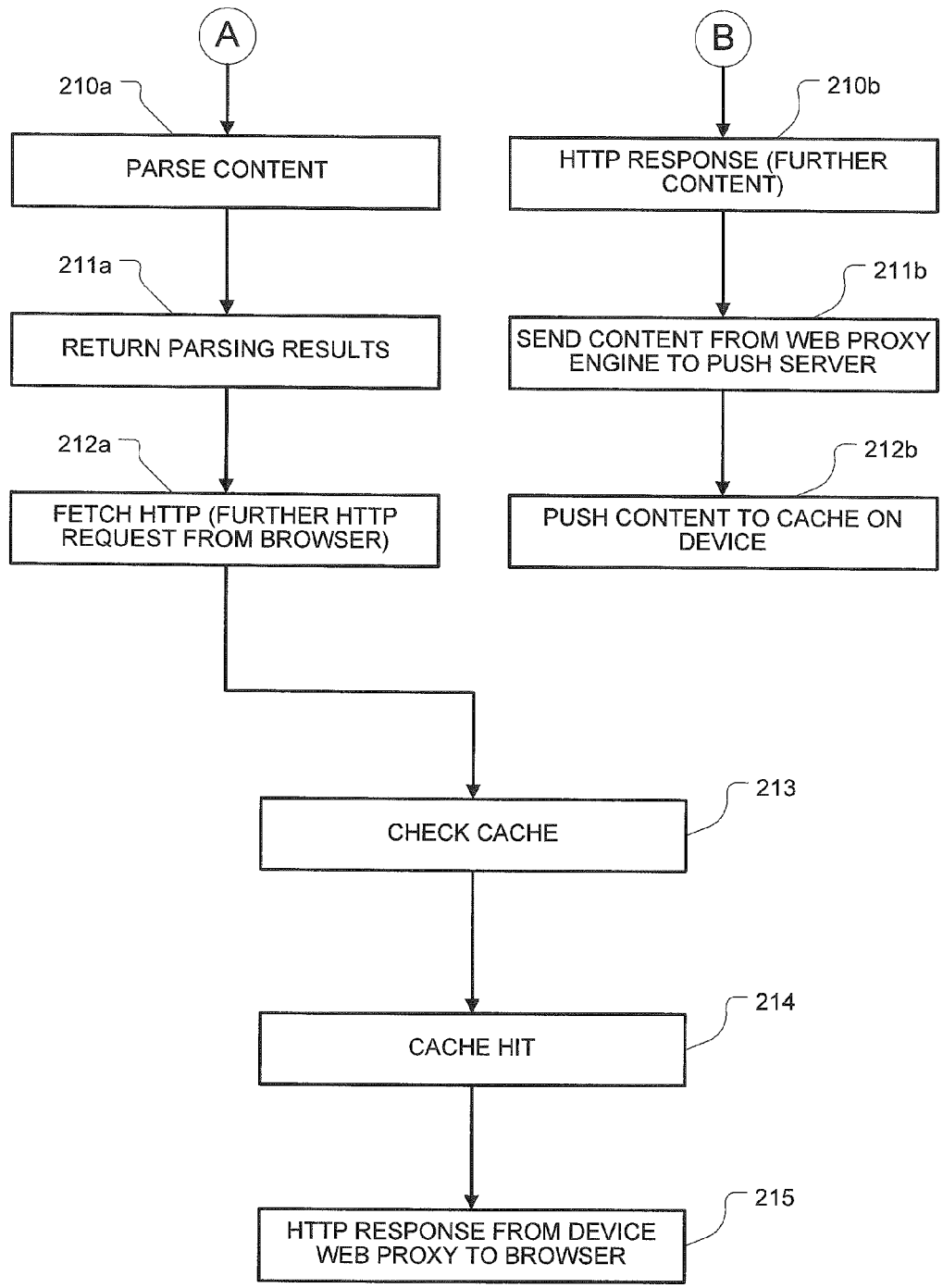
FIG. 4 is a second portion of the flowchart of FIG. 3 showing the further steps of the method of pre-caching web content for a mobile device.

The network proxy 200 includes, as noted above, its own web proxy engine 291 for communicating with the device web proxy 192 of the mobile device. The web proxy engine 291 may be disposed on a server at the network proxy (e.g. NOC) or distributed over a cluster of servers. In the specific implementation depicted by way of example in FIG. 2, the network proxy 200 includes its own content parser 293 for parsing content of web pages transmitted from the network proxy 200 to the mobile device 100. The content parser or content parsing module 293 may be executed on a server or a cluster of servers. In the specific implementation depicted by way of example in FIG. 2, the network proxy 200 further includes a push server 294 for pushing content to the content cache 194 on the mobile device 100, as will be described in greater detail below. It should be appreciated that the push server 294 may be disposed outside the network proxy 200. Indeed, the content parsing module 293 may also be disposed outside the network proxy 200 as well. The messaging sequence for web browsing using this novel pre-caching technology will now be described with reference to FIG. 2 as well as to the related flowcharts presented in FIGS. 3 and 4. It should be understood that FIGS. 3 and 4 show first and second portions, respectively, of a flowchart depicting main steps of pre-caching web content. In other words, the flowchart of FIG. 3 continues onto FIG. 4.

At step 201, the browser sends a web request, e.g. a hypertext transfer protocol (HTTP) fetch message, to its device web proxy 291. This HTTP message (request) signifies what web page or content that the mobile device 100 seeks to download. A "web request" may includes not only an HTTP message but other forms of request messages such as, for example, those used for File Transfer Protocol (FTP) or web sockets. At step 202, the device web proxy 192 first checks the local cache (content cache 194) on the mobile device 100 to determine whether the requested web content is already cached in the memory 120, 130 of the mobile device 100. In this example, it is assumed that the requested web content is not already cached on the mobile device 100. Step 203 is thus a cache miss, meaning that the cache returns a reply to signify that the sought-after content is not in the content cache 194. At step 204, the device web proxy 192, upon receiving an indication that the content cache 194 does not contain the requested web content, communicates a message to the web proxy engine 291 at the network proxy 200 that web content is to be obtained. The web proxy engine 291 at the network proxy 200 forwards this web request (step 205) through the Internet 300, using suitable Internet protocols, to the web server 301 that hosts the desired content (in this example, web server 1). At step 206, a web response (e.g. an HTTP response) from the web server 301 (e.g. web server 1) is returned to the web proxy engine 291 at the network proxy 200. The web proxy engine 291 at the network proxy 200 may implement a content cache (not depicted) of retrieved content to provide faster content retrieval. If used, the web proxy engine 291 would first check its own content cache to determine if the requested content is already stored in the cache. If the content is present in the cache, the requested content can be returned from the content cache of the web proxy engine. If however, the requested content is not stored in the content cache associated with the web proxy engine, the requested content is requested from the appropriate web server, and the HTTP response may be stored in the web proxy engine's content cache.

As shown in FIG. 2 and in the flowchart of FIG. 3, the HTTP response is forwarded back to the device web proxy 192 at the mobile device 100 (at step 207a). At the mobile device 100, the device web proxy 192 sends the received content to the content cache 194 (at step 208a) where this content is stored. The web content is also passed on to the browser 191 (at step 209a).

The web proxy engine 291 at the network proxy 200 sends the received content from the web response (e.g. HTTP response) to the content parsing module 293 at the network proxy 200 for content parsing. At step 208b, the content parsing results are returned to the web proxy engine 291 at the network proxy 200. Based on these results, the web proxy engine 291 at the network proxy 200 may determine, or at least attempt to predict, the web content that the user of the mobile device 100 is likely to request next. Based on this determination or prediction, the web proxy engine 291 at the network proxy 200 sends a further HTTP fetch message (step 209b) to the same web server or to a different web server to request further web content. This further request may be done without any input, prompting or intervention by the mobile device. In this particular example, the further request and response are to (and from) a different web server (e.g. web server n) which may or may not be clustered with the first web server, e.g. web server 1).

The response (step 210b) from the web server to the web proxy engine 291 at the network proxy 200 is sent (step 211b) to the push server 294 at the network proxy 200. The push server 294 then pushes or otherwise communicates the HTTP response (further web content) to the content cache 194 of the mobile device 100 (step 212b). It should be understood that the push server 294 may be any server capable of directing the further web content to the content cache 194 of the mobile device 100, including a router, messaging service, relay service, or other server capable of causing data to be sent to the mobile device.

Referring now to FIG. 2 and to the flowchart of FIG. 4, once the browser 191 has received the response (step 209a), as already described above, the mobile device parses the received web content (step 210a). The results of this content parsing are returned (step 211a), from which various inferences may be drawn about the web content the user will next wish to view. The browser 191 of the mobile device 100 then sends an HTTP fetch message (step 212a) or other such web request to request the further web content. This message is sent to the device web proxy 192 on the mobile device 100 which queries the content cache 194 on the mobile device 100 (step 213) to see if the content has been pre-cached. Assuming in this illustrative example that the content has indeed been pre-cached, the pre-cached web content is then supplied (step 214) to the device web proxy 192 which passes it to the browser 191 (step 215) for rendering onscreen. It should be understood that when the further content is obtained from the content cache 194 on the mobile device 100, it is unnecessary for the device web proxy 192 to send the HTTP fetch message (or other web request) to the web proxy engine 291 at the network proxy 200. Advantageously, the quantity of uplink messages (e.g. from the mobile device 100 to the network proxy 200) may be reduced when the further web content has been pre-cached by the push server 294 without a specific request from the mobile device 100 for the further web content.

Figure 5:
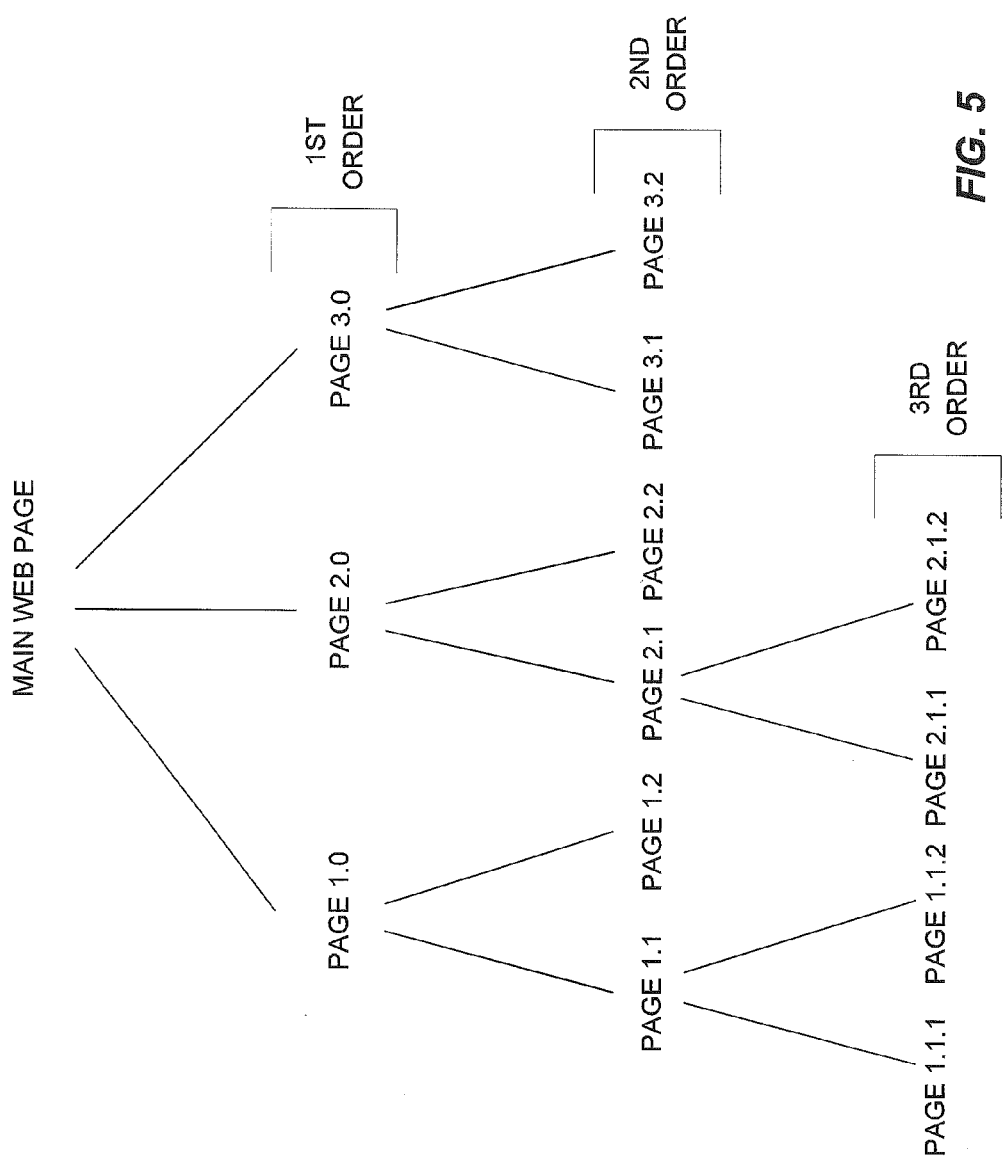
FIG. 5 is a schematic depiction of a hierarchically constructed web site having first order, second order and third order links.

FIG. 5 is a schematic depiction of a hierarchically constructed web site having first order, second order and third order links. In this example, the web site has three levels or orders of links that branch out in a tree-like manner from a main web page or home page. Specifically, as shown by way of example in this figure, the main web page contains three first-order links to page 1.0, page 2.0 and page 3.0. Page 1.0 contains (again by way of example only) two second-order links to page 1.1 and page 1.2. Page 2.0 also contains two second-order links to page 2.1 and page 2.2. Page 3.0 also contains two second-order links to page 3.1 and page 3.2. Still by way of example only, page 1.1 contains two third-order links to page 1.1.1 and page 1.1.2. Page 2.1 contains two third-order links to page 2.1.1 and 2.1.2.

In a conventional technique not improved by the technology disclosed in present disclosure, the device may send web requests (e.g. HTTP requests) for each successive page that the user requests. Thus, for example, if the user goes to the home page (main web page) and then clicks on the first-order link to view page 2.0, the web request (e.g. HTTP fetch) and response are sent and received over the air, thereby giving rise to latency issues and slow performance. On the other hand, using this novel pre-caching technology, the mobile device, upon browsing to the main web page, may begin the process of pre-caching the first order links (caching pages 1.0, 2.0 and 3.0). When the user requests page 2.0, this page is already cached on the device. This improves performance dramatically as compared with the conventional approach.

In one implementation, the pre-caching may entail obtaining web content for all first order pages when the downloaded content is the main page. For example, if the user navigates to a first level web page, the pre-caching would then be performed for second-order pages linked to that particular first-level web page. In another implementation, the pre-caching could obtain all web pages that are linked (branched) from the currently rendered web page.

In another implementation, the mobile device may take into account usage patterns, current location, current date and current time in assessing what pages (content) to pre-cache. For example, the device may determine based on programming logic or device configuration that every weekday morning at 9:15 a.m., the user consults a certain link of his corporate web page. This content could be pre-cached every weekday morning just before 9:15 a.m.

In another implementation, the mobile device may learn that the device consults a specific web page or link after he or she has downloaded or viewed another web page. For example, the mobile device may learn that the user goes to a particular online shopping site after having visited his online banking site. As another example, the device may learn that the user always visits a certain car rental site after having booked a flight to a certain destination. These are but a few examples of how the device may learn usage patterns for the purposes of pre-caching web content.

Usage patterns may also be used in conjunction with content parsing of received web content to filter all the available further web content down to the specific web content in which the user has historically shown an interest. For example, the content parsing may suggest that all first order links are to be pre-cached. However, if the web site has more than a predetermined threshold number of first-order links, the pre-caching can become inefficient and burdensome on wireless resources. In that case, usage patterns may be used to filter out certain first-order links that have never been consulted by the user. For example, if the user visits a news web site like www.cnn.com, some of the first-order links may be filtered out by applying usage patterns that suggest that the user has never, in any of his previous visits to this web site, clicked on links relating to sports or entertainment. The web content associated with those links would thus be skipped when pre-caching because the user has historically not shown any interest in that type of content.

In one implementation of this technology, the mobile device may pre-cache certain types of files such as, for example, embedded images, Javascript, Cascading Style Sheets (CSS).

In one implementation of this technology, the mobile device may purge content after a predetermined amount of time has elapsed. Alternatively, when the cache approaches a full status, the oldest content may be purged. Purging of the cache may also be done when the user does not visit the web site for a predetermined period of time, or as usage patterns change over time. Clearing of the cache may also be done manually (by the user) or when the user closes the browser. As will be appreciated, there are many different ways for the cache to be cleared or purged.

In one implementation of this technology, the mobile device may send a compressed map of its cache to the server to indicate to the server what content it already has in its cache. This compressed map will help to avoid sending duplicate content to the device where the pre-fetching and a separate fetch request are sent in parallel or in close temporal proximity.

In one implementation of the technology, the push server at the network proxy may be configured to push additional web content to the content cache in different ways. For example, in one specific implementation, the push server immediately pushes all web content that it receives to the content cache. In another specific implementation, the push server store some of the additional web content and push only a portion of the web content it receives to the content cache so as not to overwhelm the cache. For example, with reference to the web site depicted in FIG. 5, the network proxy may pre-fetch all first-order links and second-order links when the mobile device user accesses the home page. The network proxy may then store all the web content for the first-order and second-order links but push only the web content for the first-order links to the content cache. The web content for the second-order links would remain stored at the network proxy until, for example, the browser fetches the web content associated with a first-order link, at which time the web content for the second-order links is pushed to the content cache on the mobile device. This latter implementation uses the network proxy as an intermediate storage node for holding data that is not immediately required by the mobile device. In a variant, the push server may push certain types of data to the content cache and store other types of data depending on web browsing history (usage patterns), time, location, or other factors.

Any of the methods discloses herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a mobile device or other computing device cause the mobile device or other computing device to perform one or more of the foregoing method(s).

A computer readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This new technology has been described in terms of specific implementations and configurations which are intended to be exemplary only. Persons of ordinary skill in the art will, having read this disclosure, readily appreciate that many obvious variations, refinements and modifications may be made without departing from the inventive concept(s) disclosed herein and as defined in the appended claims.

The invention claimed is:

1. A method at a mobile device, the method comprising:
   receiving a web request message for requested web content;
   forwarding the web request message to a network proxy;
   receiving the requested web content from the network proxy;

displaying, after the receiving, the requested web content;
determining that a number of links in the requested web content is greater than a threshold;
selecting links from the links in the requested web content based on usage patterns, the number of selected links being no greater than the threshold;
receiving additional content related to the requested web content at the mobile device, the additional content including all content identified by the selected links in the requested web content;
caching the additional content in a content cache at the mobile device;
receiving a user selection of a first link of the selected links in the requested web content;
retrieving, from the content cache at the mobile device, second web content identified by the first link from the content cache, the second web content being part of the additional content;
request, from the network proxy, second additional content related to the second web content, the second additional content including all content identified by links in the second web content;
receiving, from the network proxy, the second additional content; and
caching the second additional content.

2. The method of claim 1, wherein the additional content is based on parsing of the requested content.

3. The method of claim 2, wherein the additional content is further based on usage patterns from the mobile device.

4. The method of claim 3, wherein the usage patterns include historical preferences for links from requested web content.

5. The method of claim 3, wherein the usage patterns include historical preferences for non-linked web content.

6. The method of claim 1, wherein the receiving the additional content is from a push server communicating with the network proxy.

7. A mobile device, comprising:
a processor;
a communications subsystem; and
memory,
wherein the mobile device is configured to:
receive a web request message for requested web content;
forward the web request message to a network proxy utilizing the communications subsystem;
receive the requested web content from the network proxy;
display, after the receiving, the requested web content;
determine that a number of links in the requested web content is greater than a threshold;
select links from the links in the requested web content based on usage patterns, the number of selected links being no greater than the threshold;
receive additional content related to the requested web content at the mobile device, the additional content including all content identified by the selected links in the requested web content;
cache the additional content in a content cache at the mobile device;
receive a user selection of a first link of the selected links in the requested web content;
retrieve, from the content cache at the mobile device, second web content identified by the first link from the content cache, the second web content being part of the additional content;
request, from the network proxy, second additional content related to the second web content, the second additional content including all content identified by links in the second web content;
receive, from the network proxy, the second additional content related; and
cache the second additional content.

8. The mobile device of claim 7, wherein the additional content is based on parsing of the requested content.

9. The mobile device of claim 8, wherein the additional content is further based on usage patterns from the mobile device.

10. The mobile device of claim 9, wherein the usage patterns include historical preferences for links from requested web content.

11. The mobile device of claim 9, wherein the usage patterns include historical preferences for non-linked web content.

12. The mobile device of claim 7, wherein the receiving the additional content is from a push server communicating with the network proxy.

13. A non-transitory computer-readable medium comprising instructions in code which when loaded into a memory and executed by a processor of a mobile device cause the mobile device to:
receive a web request message for requested web content;
forward the web request message to a network proxy utilizing the communications subsystem;
receive the requested web content from the network proxy;
display, after the receiving, the requested web content;
determine that a number of links in the requested web content is greater than a threshold;
select links from the links in the requested web content based on usage patterns, the number of selected links being no greater than the threshold;
receive additional content related to the requested web content at the mobile device, the additional content including all content identified by the selected links in the requested web content;
cache the additional content in a content cache at the mobile device;
receive a user selection of a first link of the selected links in the requested web content;
retrieving second web content identified by the first link from the content cache, the second web content being part of the additional content;
request, from the network proxy, second additional content related to the second web content, the second additional content including all content identified by links in the second web content;
receive, from the network proxy, the second additional content; and
cache the second additional content.

14. The non-transitory computer-readable medium of claim 13, wherein the additional content is based on parsing of the requested content.

15. The non-transitory computer-readable medium of claim 14, wherein the additional content is further based on usage patterns from the mobile device.

16. The non-transitory computer-readable medium of claim 15, wherein the usage patterns include historical preferences for links from requested web content.

17. The non-transitory computer-readable medium of claim 13, wherein the usage patterns include historical preferences for non-linked web content.

* * * * *